No. 770,129. PATENTED SEPT. 13, 1904.
B. O. TILDEN.
TRAP.
APPLICATION FILED MAY 6, 1904.
NO MODEL.

Witnesses:
Galderou C. Fuss
R. M. Pittman

Inventor:
Bert Olen Tilden,
By his attorney,
F. H. Richards

No. 770,129. Patented September 13, 1904.

UNITED STATES PATENT OFFICE.

BERT OLEN TILDEN, OF NEW YORK, N. Y.

TRAP.

SPECIFICATION forming part of Letters Patent No. 770,129, dated September 13, 1904.

Application filed May 6, 1904. Serial No. 206,607. (No model.)

*To all whom it may concern:*

Be it known that I, BERT OLEN TILDEN, a citizen of the United States, residing in Manhattan borough, New York, in the county of New York and State of New York, have invented certain new and useful Improvements in Traps, of which the following is a specification.

The present invention is designed, primarily, to provide such a trap as will cause such an action of the liquid as it enters the trap as will float the lighter foreign bodies contained in the liquid—such as grease, &c.—to the center, when they will be carried off through the stand-pipe.

A further feature of this invention resides in the simplicity, durability, and cheapness of manufacture of the device.

In carrying out this invention I so organize the construction that the fluid will enter the trap in a downward flow from a point without the trap and will be transformed into a body rotating transversely to the longitudinal axis of trap, and for the purpose of causing such rotary action I preferably provide a deflector which may be so suitably disposed as to interrupt the incoming flow and throw it against the wall of the trap, when such aforesaid rotary motion of the fluid will be inaugurated and will cause the particles of such matter as would ordinarily adhere to the walls of the trap to flow to the center thereof, and thereby pass on into the stand-pipe before it has an opportunity to adhere to the walls of said trap.

Figure 1:
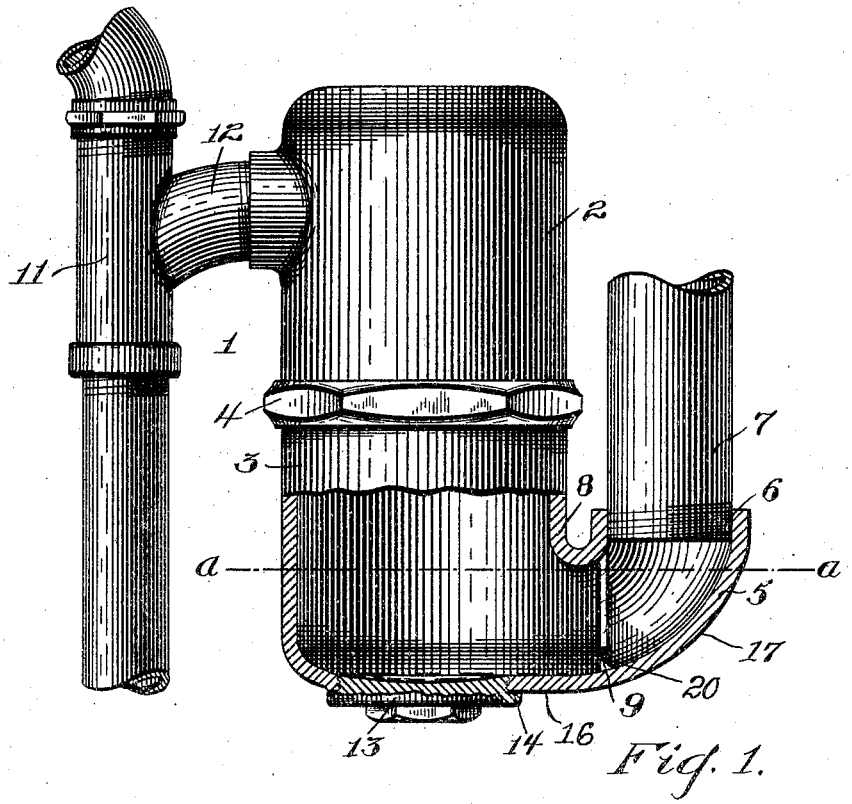
Figure 2:
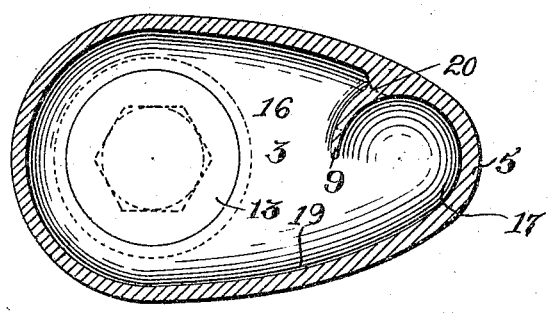

In the particular application of the invention shown in the drawings forming a part of this specification, Figure 1 illustrates an elevational view of the trap with a portion broken away to show the interior construction, and Fig. 2 is a horizontal section on the line *a a* of Fig. 1.

Similar characters of reference indicate like parts throughout the figures.

For convenience of setting, as well as for purposes of original manufacture, the body of the trap 1 is preferably formed of two parts, (indicated in a general way by 2 and 3, respectively.) These parts may be connected together by a union or nut 4 and when so connected are adjustable one upon the other for the purpose, among others, of allowing the adaptation of the trap to positions where the distance between the inlet-pipe 7 and the outlet-pipe 11 may be varied in measure. At the same time said union permits the parts 2 and 3 to be readily separated at will, since when said parts are disconnected, as indicated, the lower portion 3 of the trap may be swung sidewise by turning the threaded portion 6 a small part of a revolution around the inletpipe 7, and thus permitting access to said lower portion 3 for whatever purpose desired. Also, as is obvious, said lower portion 3 may, if desired, be removed or replaced or a new portion substituted therefor. At any suitable point within this mouth, but preferably at the juncture of the wall 8 of the trap, I provide means for interrupting the incoming flow of water, such means in the present instance comprising a deflector 9, extending partly across that opening where the elbow 5 enters the wall of the trap. This deflector 9, if desired, may be secured to the interior of the trap in any suitable manner; but for convenience and cheapness of manufacture the same, as shown, will probably be cast integral with that section of the trap to which it belongs. By means of this deflector 9 the inward course of the liquid is interrupted at the instant of entrance into the trap, whereby the liquid is thereafter caused to be thrown over against the wall 19, when, owing to the symmetrical shape of said wall, the fluid will be forced to commence to so circulate as to pass out of the trap into the stand-pipe 11 without giving the particles of matter a chance to adhere to the wall of said trap.

In the form of trap shown I provide a suitable connection 12 between the trap and the effluent-pipe 11, and the bottom of the trap may also be provided, as shown, with the usual trap screw or plug 13, (shown in Fig. 1,) which is threaded into said trap, and a suitable gasket 14 is provided, as usual.

One feature of the present invention relates to the construction of that portion of the trapchamber 3 where the inlet-pipe enters at the side (at the right hand of Fig. 2) of the trap. It will be observed that the lower wall or bottom plate 16 of said lower trap-chamber 3 is extended directly into the curved wall 17 of the pipe-receiving extension and that said lower or outer wall of said extension forms a curved continuation of said lower plate 16, the effect being to bring even a small stream of fluid entering the trap into direct impingement with said curved wall and thence conduct the fluid inwardly along the lower wall of the trap in such manner as to give the action extremely high efficiency for the purpose of dislodging any accumulation of matter which might otherwise tend to accumulate thereon.

In order to make the action of even a small stream of fluid entering the trap have a relatively high efficiency for the purpose of keeping the bottom plate of the trap free of accumulations, the outer wall of the said part 3, including the lateral extension thereof, as seen in plan view in Fig. 2, are disposed substantially symmetrical, and the deflector 9 may be extended downwardly only to a point slightly above the bottom plate 16 of said chamber 3, thus leaving a slight space 20 underneath said deflector 9. When a small stream coming down the pipe 7 strikes the lower curved wall 17 of said lateral extension of the chamber 3, it is evident that said stream will naturally be so deflected as to pass downward under the deflector 9, as well as to one side of the same, and will thus act upon and wash the entire area of the bottom plate of the said trap member 3; but when the incoming stream becomes slightly larger a considerable portion of the same will be turned by the deflector 9 so as to pass more of it toward one side of the chamber 3, (toward the lower side of said chamber, as shown in Fig. 2,) and will thus create a rotary motion for the purpose of making a low-pressure center zone passing through the height of the trap to the outlet, this being for the purpose of gathering the floating solid light-weight material into the center of the trap, and thus leading it out into the stand-pipe. In this manner the trap is adapted for widely varying ranges of conditions. When the amount of fluid entering the trap is very small, the deflector 9 becomes substantially inoperative and becomes more and more operative and effective for the purpose of causing the rotary motion of the mass of fluid as the size of the incoming stream increases. At the same time whenever solid pieces of considerable size enter the trap these will be deflected and thrown into a rotary movement, notwithstanding the amount of fluid coming in at the same time may be quite small. By making the trap of substantially the symmetrical section indicated in Fig. 2 the two outer walls are symmetrically disposed in a manner to favor the proper spreading of the incoming stream when this is of small volume, thereby to subject the entire area of the lower wall of said chamber to the washing action of the stream.

It will now be observed that the fluid entering the trap comes in through an inlet-pipe 7, which is connected to said trap by an elbow 5, situated on the outside of the trap and connected with the interior thereof, and that the flow coming down said pipe will pass uninterruptedly on and along the bottom of the trap, as hereinbefore specified. It will also be observed that by constructing the deflector in the manner set forth—that is, not making the same integral with the bottom of the trap—the same may be suitably bent to position within the section according to the angle or location desired.

It will now be observed that I provide a trap and means therewith associated which will cause the liquid entering the trap to flow against a deflecting means, cause it to spurt against the wall of the trap, and then start around on its reverse course. It will also be observed that by creating the space underneath the deflector small discharges of fluid will constantly wash along the bottom of the trap, and therefore keep the same clean.

The specific construction of the invention, as shown in the drawings hereto attached, is only one embodiment thereof, and within its purview other arrangements of parts may be consistently resorted to.

Having thus described this invention, I claim—

1. A trap consisting of an air-tight vessel, an inlet entering said vessel along and forming a continuation of the bottom wall thereof, an outlet-pipe leading out through the wall of said vessel above the level of the inlet-pipe, and a deflector situated in the inlet and projecting into the path of flow for deflecting the course of the liquid thereinto.

2. A trap consisting of an air-tight vessel, an inlet entering said vessel along and forming a continuation of the bottom wall thereof, an outlet-pipe leading out through the wall of said vessel above the level of the inlet-pipe, and a deflector situated in the inlet and projecting into the path of flow for deflecting the course of the liquid thereinto, said means being so disposed as to leave a space between it and the bottom of the trap.

3. A trap comprising an air-tight vessel, an inlet leading into said vessel and forming a continuation of the bottom thereof, an outlet from said vessel and above the level of the inlet, and means projecting from the wall of the inlet into the path of flow for interrupting the flow into the trap, said means being so constructed as to form a space between it and the bottom of the trap.

4. A trap comprising an air-tight vessel, an inlet running into said vessel and forming a continuation of the bottom thereof, an outlet from said vessel and above the level of the inlet, and a deflector formed integral with the inlet and extending into the path of flow for interrupting the course of flow into the trap, said deflecting means being so disposed as to leave a space between it and the bottom of the trap.

Signed at Nos. 9 to 15 Murray street, New York, N. Y., this 28th day of April, 1904.

BERT OLEN TILDEN.

Witnesses:
FRED. W. BARNACLO,
JOHN O. SEIFERT.